(12) United States Patent
Bell

(10) Patent No.: US 10,611,526 B2
(45) Date of Patent: Apr. 7, 2020

(54) ENVELOPING MAILING CONTAINER WITH TRANSPARENT SECURITY WINDOW

(71) Applicant: Gary M. Bell, Crystal, MN (US)

(72) Inventor: Gary M. Bell, Crystal, MN (US)

(*) Notice: Subject to any disclaimer, the term of this patent is extended or adjusted under 35 U.S.C. 154(b) by 0 days.

(21) Appl. No.: 15/928,304

(22) Filed: Mar. 22, 2018

(65) Prior Publication Data

US 2019/0225379 A1 Jul. 25, 2019

Related U.S. Application Data

(63) Continuation-in-part of application No. 29/634,275, filed on Jan. 19, 2018, now Pat. No. Des. 828,869.

(51) Int. Cl.
*B65D 27/04* (2006.01)
*G01N 21/90* (2006.01)
*B65D 27/34* (2006.01)
*B65D 27/14* (2006.01)

(52) U.S. Cl.
CPC ............ *B65D 27/04* (2013.01); *B65D 27/14* (2013.01); *B65D 27/34* (2013.01); *G01N 21/90* (2013.01)

(58) Field of Classification Search
CPC ......... B65D 27/04; B65D 27/14; B65D 27/34
See application file for complete search history.

(56) References Cited

U.S. PATENT DOCUMENTS

| | | | |
|---|---|---|---|
| 3,318,510 A | 5/1967 | Quarles et al. | |
| 3,652,008 A | 3/1972 | Grotefend | |
| 4,729,506 A * | 3/1988 | Neubauer | B42D 5/025 229/69 |
| 5,062,570 A * | 11/1991 | Ashby | B42D 5/025 229/69 |
| 6,029,883 A * | 2/2000 | Hechinger | B65D 27/04 229/71 |
| 6,217,079 B1 * | 4/2001 | Fabel | B42D 15/006 229/301 |
| D471,229 S * | 3/2003 | DeFranco | D19/3 |
| 2003/0075593 A1 | 4/2003 | Wood | |
| 2003/0085261 A1 * | 5/2003 | Wierer | B65D 27/04 229/71 |
| 2003/0141352 A1 * | 7/2003 | Smith | B65D 27/04 229/71 |
| 2003/0183680 A1 | 10/2003 | Makofsky et al. | |
| 2005/0051609 A1 * | 3/2005 | Wood | B65D 27/04 229/71 |

(Continued)

OTHER PUBLICATIONS

International Search Report and Written Opinion issued in related PCT/US2019/12503, dated Apr. 1, 2019.

(Continued)

*Primary Examiner* — Derek J Battisti
(74) *Attorney, Agent, or Firm* — Barnes & Thornburg LLP; Jeffrey R. Stone

(57) ABSTRACT

An enveloping mailing container comprising a substantially opaque front and back side with at least one transparent section defined on the front and/or the back side of the enveloping mailing container. The at least one transparent section allows visualization of contents therein such as dangerous powder or other materials and/or confirmation that no dangerous powder or other materials are present in the container without compromising the confidentiality of the materials legitimately mailed in the enveloping mailing container.

13 Claims, 3 Drawing Sheets

(56) References Cited

U.S. PATENT DOCUMENTS

2007/0160782 A1    7/2007  Yatsuzuka et al.
2012/0000968 A1*  1/2012  Coyne ................ B65D 75/5805
                                                              229/87.05
2012/0037689 A1*  2/2012  Feist ..................... B65D 31/10
                                                              229/67.4

OTHER PUBLICATIONS

Scanna-MSC.com, "Scanmax 25 Postal X-ray Machine" [online], Mar. 10, 2018 (Mar. 10, 2018), (retrieved from the internet on Feb. 27, 2019), <URL http://www.scanna-msc.com/uk/shop/mailroom-x-ray-cabinet-scanmax-25/>; Entire document.

* cited by examiner

ENVELOPING MAILING CONTAINER WITH TRANSPARENT SECURITY WINDOW

CROSS REFERENCE TO RELATED APPLICATIONS

This application is a continuation-in-part of design application Ser. No. 29/634,275, filed Jan. 19, 2018 and titled MAILER DEVICE WITH TRANSPARENT PERIMETER, the entire contents of which are incorporated herein by reference.

FIELD OF THE INVENTION

The invention generally relates to enveloping mailing containers and the ability to see what is inside without compromising the confidentiality of documents within.

DESCRIPTION OF THE RELATED ART

Known envelopes generally do not allow a visualization of potentially dangerous materials held therein. There are paper envelopes that provide a transparent window for the recipient's address, generally located in the middle portion of the front side of the envelope, and the sender's address, generally located in the upper left corner of the front side of the envelope. However, larger envelopes and mailing devices do not provide a viewing window for visualization of potentially dangerous substances or materials, e.g., powder, contained therein while still maintaining the confidentiality of the documents or other items held within the envelope or mailing device.

The present invention overcomes these deficiencies and provides, inter alia, the above-referenced improvements.

BRIEF SUMMARY OF THE INVENTION

An enveloping mailing container comprising a substantially opaque front and back side with at least one transparent section defined on the front and/or the back side of the enveloping mailing container. The at least one transparent section allows visualization of contents therein such as dangerous powder or other materials and/or confirmation that no dangerous powder or other materials are present in the container without compromising the confidentiality of the materials legitimately mailed in the enveloping mailing container.

DETAILED DESCRIPTION

Figure 1:
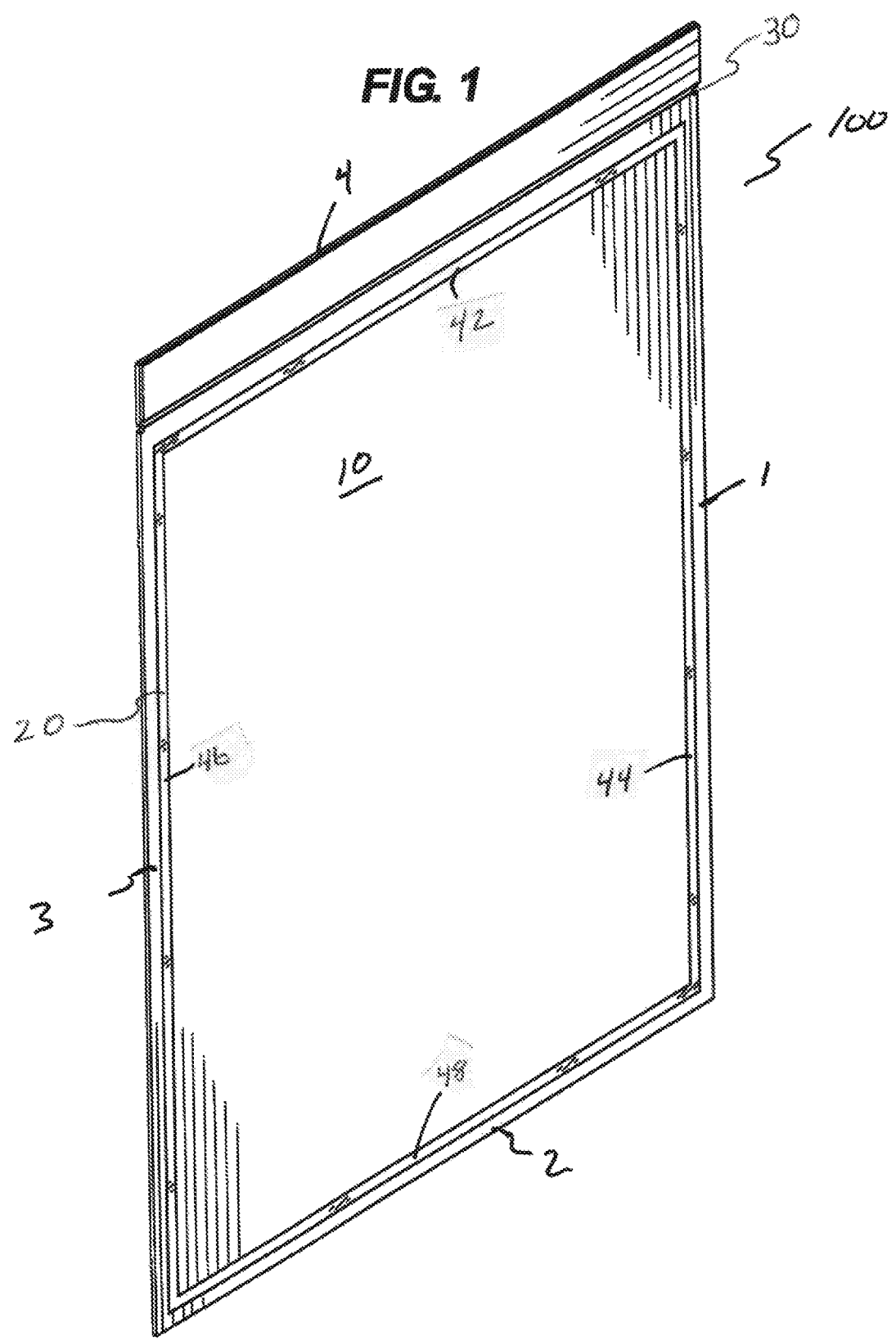
FIG. 1 is a front perspective view of an embodiment of the present invention.

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention.

With reference to the Figures, one embodiment of an enveloping mailing container 100 is illustrated. Enveloping mailing container 100 comprises a front side 10 and a back side 12, the front and back sides 10, 12 sealed together by known means along three 1, 2, 3 of four edges, with the fourth edge 4, comprising the opening into which the mailing materials are slid into an interior space 14 defined within the enveloping mailing container 100 as is commonly known with sealable envelopes. After the materials to be mailed are located within the interior space 14, the opening will be sealed by closing a flap or the equivalent over the opening and sealing with an adhesive strip or the equivalent to close the enveloping mailing container 100. The closure mechanism of enveloping mailing container 100 is exemplary and, as the skilled artisan will recognize, may comprise equivalent mechanisms, all of which are known in the art and, therefore, not described further herein. Sealed container 100 may be opened by tear notch 16 which may be disposed on the upper portion of sides 1 and 3 as shown in the Figures. Tear notch(es) 16 comprise an area that is cut or cut out from the upper portions of sides 1 and 3. A most preferred shape of tear notches 16 comprises a V-shape or an "arrowhead shape", wherein the tip, or apex, of the first and second arrowhead shaped tear notches 16 defined or disposed on upper portions of sides 1 and 3, respectively, face or point toward each other. There may be further a linear region of weakened, or thinned, material disposed between tear notches 16 to help facilitate opening the sealed closure.

Figure 2:
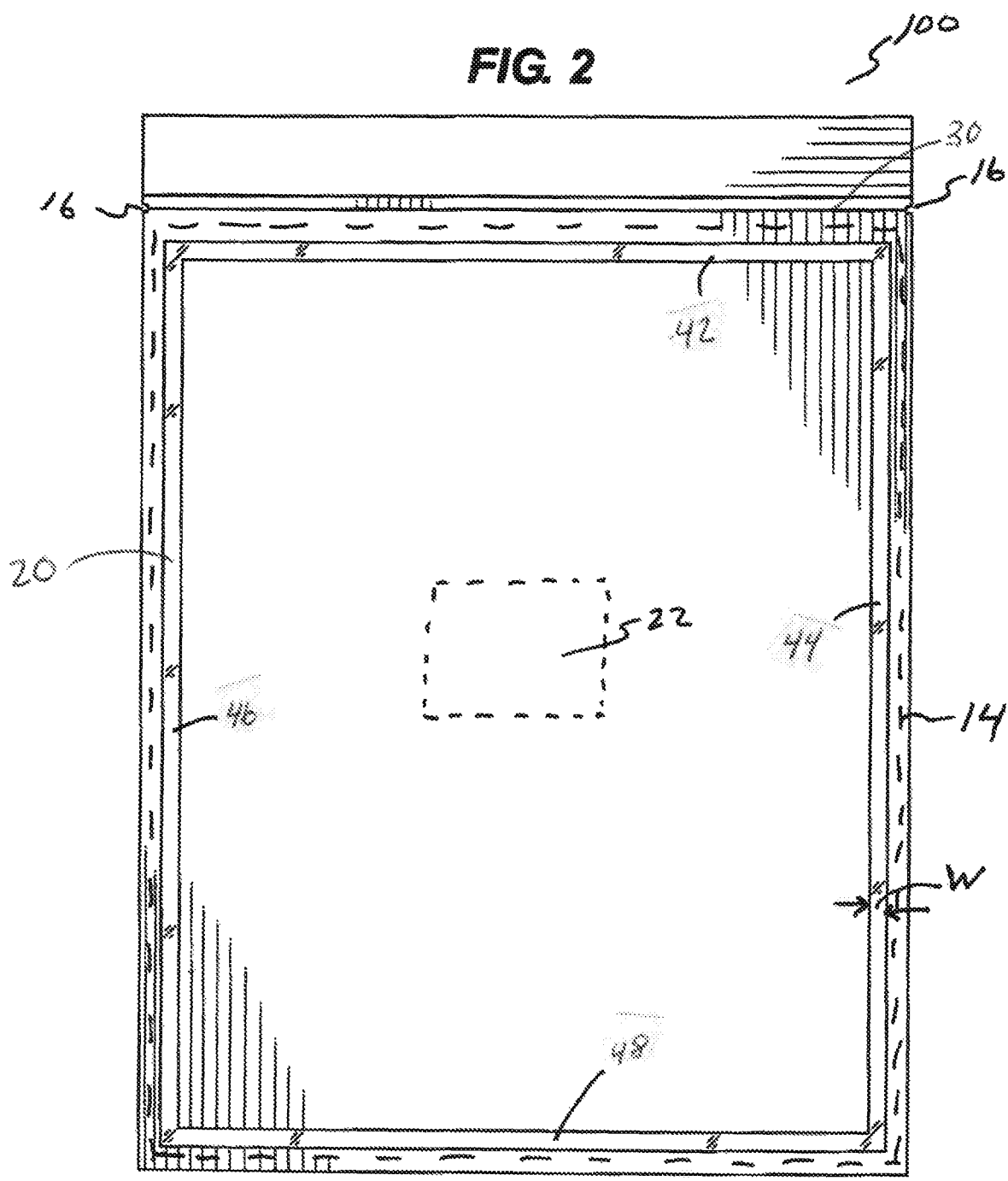
FIG. 2 is a front view of an embodiment of the present invention.
Figure 3:
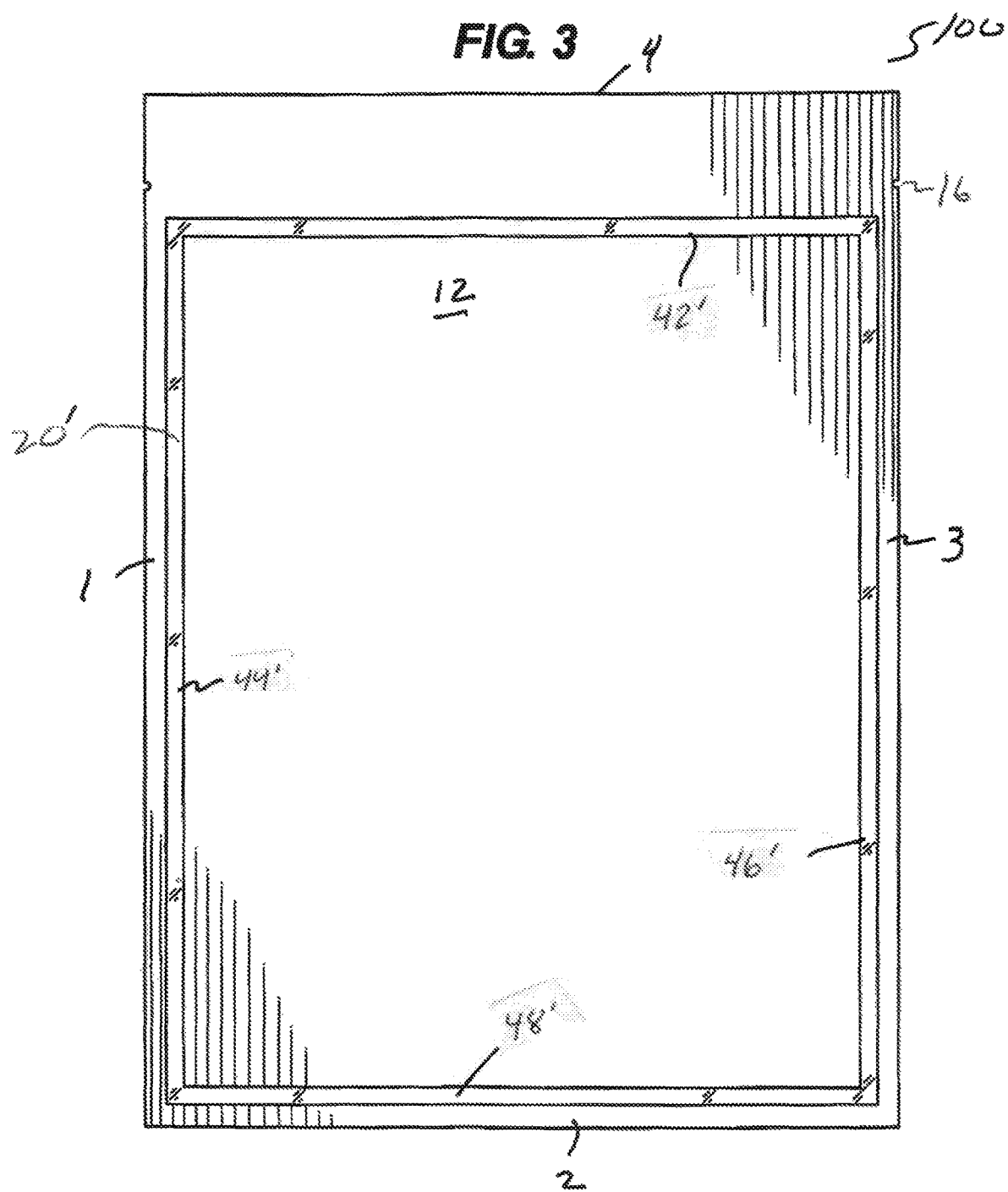
FIG. 3 is a rear view of an embodiment of the present invention.

Certain embodiments of the container 100 comprise at least one transparent section allowing visual communication of the interior space 14, wherein the at least one transparent section 20 may be disposed or located on the front side 10. An exemplary interior space 14 is illustrated in FIG. 2 with dashed lines. Moreover, at least one transparent section 20' may be disposed or located on the back side 12 of the container 100. Transparent section(s) 20 and/or 20' may comprise a single transparent section 20, 20' or may comprise a plurality or more than one transparent section 20, 20'. The transparent section(s) 20, 20' may be continuous or may be broken up and spaced across the front side 10 and/or back side 12 of the container 100. Transparent section(s) 20 and/or 20' may comprise a material that is sufficiently strong, flexible and transparent to allow visual access to the interior space 14 while withstanding the forces of shipping. An exemplary material may comprise polystyrene, though other materials will present themselves to the skilled artisan.

The primary purpose of the transparent section(s) 20, 20' is to provide visual access into the interior space to inspect or interrogate the interior space 14 for dangerous or otherwise unauthorized substances such as powders. Thus, the remaining portions of front and back sides 10,12, i.e., that not defined by the transparent section(s) 20, 20', are substantially opaque and preferably opaque.

Such inspection may be done manually or by aid of machines adapted to identify such substances. Various means for automated inspection or interrogation of the interior space 14 using machines are known in the art and may include, without limitation, taking images of the interior space 14 via the transparent section(s) 20 and/or 20' wherein the images are photographic and/or transmit energy within the visible wavelength spectrum or may be within other regions of the wavelength spectrum such as infrared. Thus, energy may be transmitted to, and in some cases through, the transparent section(s) 20 and/or 20' at at least one wavelength and at least one frequency. These images may be compared with a reference database for evidence of possible contamination by the dangerous substance(s) or evaluated by other means known to the skilled artisan.

The automated inspection or interrogation may further search along at least a portion of the transparent section(s) 20 and/or 20' for evidence of an opaqueness or transmissibility of light or other energy that is inconsistent with the transmissibility of a non-contaminated transparent section(s) 20 and/or 20'. Stated differently, interrogating energy from an interrogating machine may be substantially aligned with or focused on or move along at least a portion of the transparent section 20 and/or 20' to discover potentially dangerous regions where something such as a powder may be affixed to the interior surface of the transparent section(s) 20 and/or 20'. When such contamination evidence is discovered, the container 100 may then be flagged for further inspection.

Thus, it will now be apparent that in certain embodiments, it will be advantageous for the at least one transparent section 20 and the at least one transparent section 20' to be at least partially substantially aligned to facilitate the inspection and/or interrogation of the interior space 14, whether done manually or automatedly. In some cases, a scanner may be used to inspect or interrogate the interior space.

The location of the at least one transparent section 20 is preferably spaced away from the usual location of a mailing address section 22 on the front side 10 of the enveloping mailing container 100 and is preferably positioned to preserve confidentiality of the mailed materials sealed within the interior space 14 while allowing visual access into the interior space 14.

A preferred configuration for the at least one transparent section(s) 20 and/or 20' thus comprises locating the transparent section(s) 20 and/or 20' on the front side 10 and/or back side 12, respectively, to provide visual access along at least a portion of a perimeter of the interior space 14. This allows visual access without compromising the integrity and privacy of the mailed materials. One embodiment may thus comprise a continuous transparent section 20 and/or 20' as shown in the Figures around a perimeter of the interior space 14 and spaced away from the mailing address section 22. This embodiment may comprise a width W. In certain configurations, width W may be greater or less than 3 mm. In a preferred configuration, width W may be approximately 5 mm to facilitate visual inspection. However, it is understood that automated interrogation or inspection means may require greater or smaller widths W.

Other configurations for transparent section(s) 20 and/or 20' will now become available to the skilled artisan, each of which is within the scope of the present invention. Thus, without limitation, the transparent section(s) 20 and/or 20' may: comprise regular or irregular shapes; may be continuous or discontinuous; may be a single section or may comprise a plurality of sections; may be disposed only on the front side 10, only on the back side 12, or may be disposed on both the front and back sides 10, 12; and all, or some, of transparent section(s) 20 may, or may not be, aligned with transparent section(s) 20'.

In the case of a geometric shape, whether regular or irregular, the width W of the transparent section(s) 20 and/or 20' may, as discussed above, be sized to accommodate visual and/or automated inspection or interrogation of interior space 14.

The types of enveloping mailing containers 100 that are amenable to the various embodiments of the present invention include, but are not limited to: container manufactured with a variety of materials, e.g., and without limitation: flexible plastics such as polyethylene or a blend thereof such as polyethylene in combination with other substances; a blend comprising polyethylene terephthalate (PET) and linear low density polyethylene (LLDPE); paper; cardboard; etc.

It is preferred that the front and/or back sides 10, 12 be coated at least partially with a matte coating that reduces and/or eliminates the glossiness or glossy quality of the front and/or back sides 10, 12 in the opaque region thereof. This construction may assist in the automated inspection and/or interrogation of the interior space 14 through the transition section(s) 20 and/or 20'.

The enveloping mailing containers 100 of the present invention may be used in combination with envelopes of any size or shape or material, as well as boxes and mailing tubes, including but not limited to shipping containers sold by the U.S. Postal Service, FedEx and UPS. In the case of envelopes, the front and back sides 10, 12 may be sealed directly together or may be separated by gusset(s) as is known in the art to provide additional volume to the interior space 14 when needed.

In the unique case of mailing tubes, typically formed of cardboard in a tubular shape, one or more transparent sections may be defined on one or both ends of the tube to facilitate inspection of the interior space within the tube.

The present invention should not be considered limited to the particular examples described above, but rather should be understood to cover all aspects of the invention. Various modifications, equivalent processes, as well as numerous structures to which the present invention may be applicable will be readily apparent to those of skill in the art to which the present invention is directed upon review of the present specification.

What is claimed is:

1. An enveloping mailing container with a top edge, a bottom edge, a first side edge and a second side edge and having an opaque front side and an opaque back side sealed together to form the bottom edge and first and second side edges and having a sealable opening at the top edge adapted to be sealed and unsealed, an interior space defined between the front and back sides, a mailing address section on the front side and spaced away from the edges, and a linear region of weakened or thinned material located on the upper portion of the front and back sides, below the top edge and above the mailing address section on the front side, the linear region of weakened or thinned material configured to unseal the enveloping mailing container when the sealable opening is sealed, the enveloping mailing container comprising:

one continuous transparent section defined on the front side, the one continuous transparent section extending horizontally below and along the linear region of weakened or thinned material and between the linear region of weakened or thinned material and the mailing address section, wherein the at least one continuous transparent section defined on the front side is in visual communication with the interior space when the sealable opening is sealed and when the sealable opening is unsealed, and wherein the remainder of the front side is opaque;

one continuous transparent section defined on the back side, the one continuous transparent section extending horizontally, wherein the at least one continuous transparent section defined on the back side is in visual communication with the interior space when the sealable opening is sealed and when the sealable opening is unsealed, and wherein the remainder of the back side is opaque; and wherein the one continuous transparent section defined on the front side and the one continuous transparent section defined on the back side are aligned with each other when the sealable opening is sealed, and when the sealable opening is unsealed and the enveloping mailing container is open.

2. The enveloping mailing container of claim 1, wherein the one continuous transparent section defined on the front side further extends vertically between the mailing address section and the first side edge, wherein the one continuous transparent section defined on the front side is spaced away from the mailing address section.

3. The enveloping mailing container of claim 2, wherein the one continuous transparent section defined on the back side further extends vertically along the first side edge, wherein the one continuous transparent section defined on the back side is aligned with the one continuous transparent section defined on the front side.

4. The enveloping mailing container of claim 1, wherein the one continuous transparent section defined on the front side further extends vertically between the mailing address section and the second side edge, wherein the one continuous transparent section defined on the front side is spaced away from the mailing address section.

5. The enveloping mailing container of claim 4, wherein the one continuous transparent section defined on the back side further extends vertically along the second side edge, wherein the one continuous transparent section defined on the back side is aligned with the one continuous transparent section defined on the front side.

6. The enveloping mailing container of claim 1, wherein the one continuous transparent section defined on the front side further extends horizontally between the mailing address section and the bottom edge, wherein the one continuous transparent section defined on the front side is spaced away from the mailing address section.

7. The enveloping mailing container of claim 6, wherein the one continuous transparent section defined on the back side further extends horizontally along the bottom edge, wherein the one continuous transparent section defined on the back side is aligned with the one continuous transparent section defined on the front side.

8. The enveloping mailing container of claim 1, wherein the one continuous transparent section defined on the front side further extends: vertically along the first side edge; horizontally along the bottom edge; and vertically along the second side edge, wherein the one continuous transparent section defined on the front side is spaced away from the mailing address section; and wherein the one continuous transport section defined on the back side further extends vertically along the first side edge; horizontally along the bottom edge; and vertically along the second side edge, wherein the one continuous transparent section defined on the front side and the one continuous transparent section defined on the back side are aligned with each other.

9. The enveloping mailing container of claim 1, wherein the one continuous transparent section of the front side and the one continuous transparent section of the back side each comprise a minimum width of greater than or equal to 3 mm.

10. The enveloping mailing container of claim 8, wherein the one continuous transparent section of the front side and the one continuous transparent section of the back side each comprise a minimum width of greater than or equal to 3 mm.

11. The enveloping mailing container of claim 1, wherein the enveloping mailing container comprises one or more of the group consisting of: a flexible plastic; a blend comprising polyethylene terephthalate (PET) and linear low density polyethylene (LLDPE); paper; and cardboard.

12. An enveloping mailing container with a top edge, a bottom edge, a first side edge and a second side edge and having an opaque front side and an opaque back side sealed together to form the bottom edge and first and second side edges and having a sealable opening at the top edge adapted to be sealed and unsealed, an interior space defined between the front and back sides, a mailing address section on the front side and spaced away from the edges, and a linear region of weakened or thinned material located on the upper portion of the front and back sides, below the top edge and above the mailing address section on the front side, the linear region of weakened or thinned material configured to unseal the enveloping mailing container when the sealable opening is sealed, the enveloping mailing container comprising: more than one discontinuous transparent section defined on the front side, each of the more than one discontinuous transparent sections extending horizontally below and along the linear region of weakened or thinned material and between the linear region of weakened or thinned material and the mailing address section, wherein each of the more than one discontinuous transparent section defined on the front side is in visual communication with the interior space when the sealable opening is sealed and when the sealable opening is unsealed, and wherein the remainder of the front side is opaque; more than one discontinuous transparent section defined on the back side, each of the more than one discontinuous transparent sections being spaced away from the mailing address section and away from the top edge, the bottom edge, the first side edge and the second side edge such that each of the more than one discontinuous transparent sections extends horizontally below and along the linear region of weakened or thinned material and between the linear region of weakened or thinned material and the mailing address section, wherein each of the more than one discontinuous transparent section defined on the back side is in visual communication with the interior space when the sealable opening is sealed and when the sealable opening is unsealed, and wherein the remainder of the back side is opaque, and wherein the more than one discontinuous transparent section defined on the front side and the more than one discontinuous transparent section defined on the back side are aligned with each other when the sealable opening is sealed and when the sealable opening is unsealed and the enveloping mailing container is open.

13. The enveloping mailing container of claim 12, wherein each of the more than one discontinuous transparent sections comprise a regular shape.

\* \* \* \* \*